United States Patent [19]

French et al.

[11] 4,381,117
[45] Apr. 26, 1983

[54] BICYCLE TOTE CART

[75] Inventors: David J. French; Wayne L. Hirsch, both of Loveland, Colo.

[73] Assignee: French-Hirsch, Inc., Loveland, Colo.

[21] Appl. No.: 177,082

[22] Filed: Aug. 11, 1980

[51] Int. Cl.³ .............................................. B60D 1/06
[52] U.S. Cl. ..................................... 280/204; 280/513
[58] Field of Search .............. 280/204, 292, 513, 511; 403/122, 325, 317, 316, 322, 148

[56] References Cited

U.S. PATENT DOCUMENTS

| | | | |
|---|---|---|---|
| 3,269,760 | 8/1966 | Seckerson | 403/122 |
| 3,877,723 | 4/1975 | Fahey | 280/204 |

FOREIGN PATENT DOCUMENTS

| | | | |
|---|---|---|---|
| 576755 | 9/1932 | Fed. Rep. of Germany | 280/204 |
| 616927 | 7/1935 | Fed. Rep. of Germany | 280/204 |
| 869804 | 2/1942 | France | 280/204 |
| 2308012 | 11/1976 | France | 403/122 |
| 1902 Ad.19900 | of 1903 | United Kingdom | 280/204 |

Primary Examiner—John A. Pekar
Attorney, Agent, or Firm—Wilbur A. E. Mitchell

[57] ABSTRACT

A connector device for connecting and towing a wheeled cart to and by a bicycle, having an elongated shaft including an aligned bolt with a head and having a front longitudinally aligned socket. A pivot ball, secured to the towing bicycle, and adapted to be removably held in the socket of the device. A slidable sleeve on the shaft over the socket extension of the device for so removably holding the ball in the socket in one slidable position thereof on the shaft. A removable spring sleeve holding clamp on the shaft. A rotatable slidable collar extending over the shaft extension. A coil extension spring on the bolt portion of the shaft, between the bolt head and said collar, with said slidable rotatable collar being adapted to have the towed cart tongue secured thereto. Said connecting device permitting a rotation of either the bolt or said collar of the device, with relation to each other upon bicycle torque pulling of the towed cart, on device connection use.

1 Claim, 5 Drawing Figures

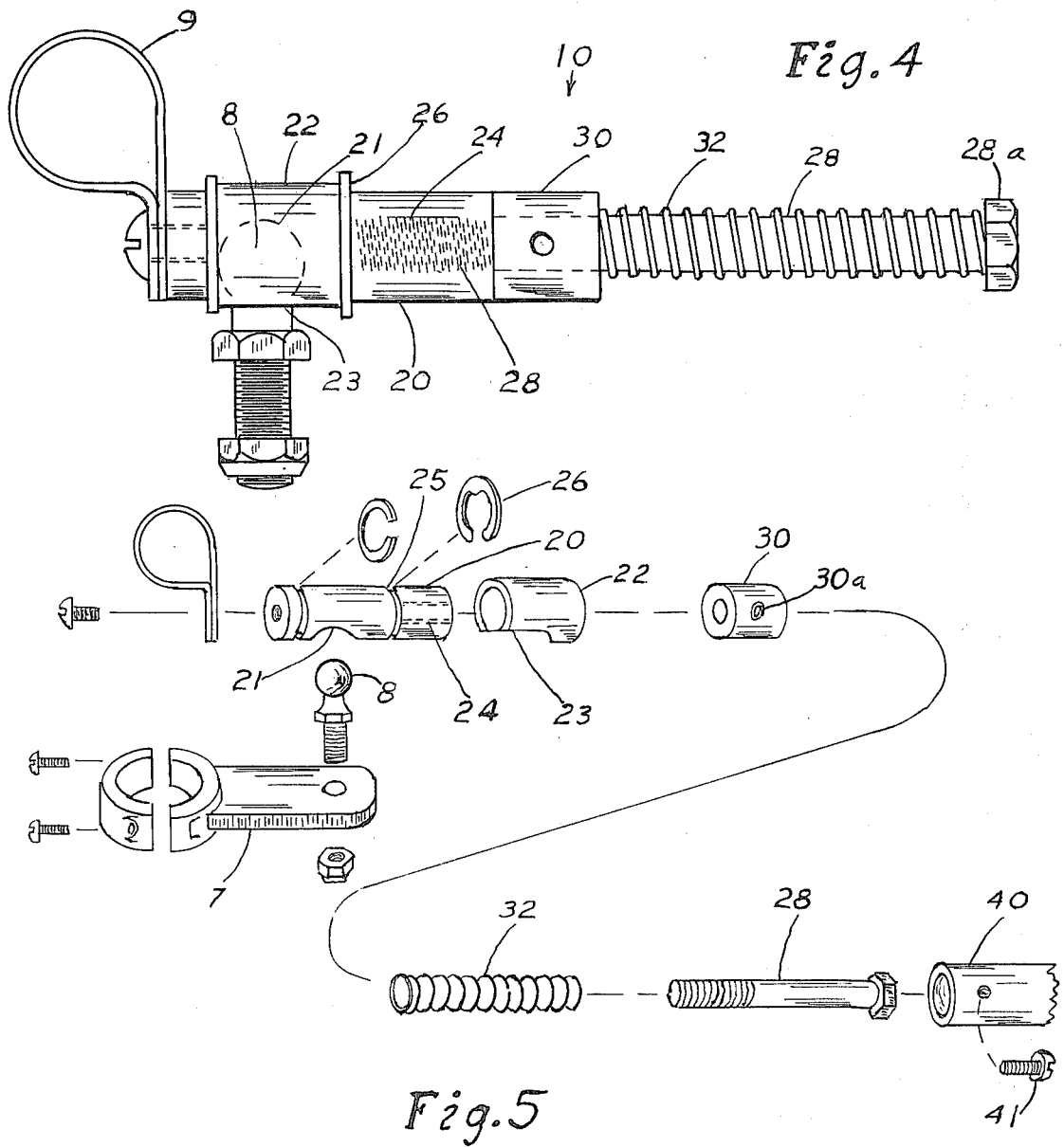

BICYCLE TOTE CART

BACKGROUND OF THE INVENTION

The present invention relates to tow carts, and particularly to a wheeled vehicle pivotally attached for towing behind a bicycle or a motorcycle.

Bicycle-towed vehicles have been known for some time, but prior known so-called towed carts had many disadvantages. One disadvantage has been an unsprung coupling tow bar connector, which makes for jerky pulling of the cart by the bicycle. Another disadvantage has been of the tipping of the towed cart when the bicycle would fall occasionally over onto the ground, due to an improper pivotal connection of the cart to the bicycle. Another disadvantage has been that the center of gravity weight of the towed cart on its wheels has been too high. Another disadvantage has been in the manufacture and shipping of the towed cart, the necessary forwardly projecting tongue or tow bar of the cart made the matter of crating very difficult with the tow bar tongue in integral relationship to the cart frame.

Accordingly, it is desirable to have a strongly built framework for a towed cart of suitable design and eliminating the disadvantages just mentioned.

PRIOR KNOWN ART

Applicants' preliminary search in the United States Patent and Trademark Office, developed the following Patents:
U.S. Pat. Nos. 1,927,591, 3,271,048, 1,977,065, 3,999,777, 2,134,931, 4,077,646.
It is submitted that said references do not disclose or teach the novel features of this invention.

SUMMARY AND OBJECTS OF THE INVENTION

The main objective of this invention is to provide a non-ball rotatable spring pulling bar connector device, for attaching a towed vehicle to a pulling bicycle, and to eliminate the above enumerated disadvantages of the prior art.

Another object of the invention is to provide such a connector device having a 180° rotatable sprung pull bar, permitting the bicycle to be laid on its side on the ground, when it is connected by the connector device pull bar to a towed vehicle, and which will not then thereby cause the towed vehicle to be upset, as a result of the connector device rotatable tow bar being rotatably independent of the pivot ball and socket of said bar.

A further object of this invention is to provide such a spring tensioned pulling connector device with the tongue tow bar of the towed vehicle for permitting a smooth spring tension towing of the vehicle by the bicycle when going over uneven terrain.

A further object of this invention is to provide such a towed vehicle with an underslung frame hung below its center of gravity on and with relation to the axles of its plural wheels.

A further object of this invention is to provide the tow bar tongue of the towed vehicle of removable telescopic connection parts, whereby, in crating for and shipping thereof, that it may be disassembled and later assembled after the crate is opened on its destination, without requiring a full size towed vehicle shipping crate.

BRIEF DESCRIPTION OF THE DRAWINGS

The above and other objects of this invention will be apparent to those skilled in the art from the following detailed description and as disclosed in the drawings, in which:

FIG. 4 is an enlarged view of our novel Connector Device, by means of which we attach our towed vehicle to a towing bicycle, and FIG. 5 is an exploded view of our connector device, showing all of its components, and together with the ball by which it is attached to the towing bicycle and also showing a fragmentary part of the towed vehicle hollow tongue member.

DETAILED DESCRIPTION OF A PREFERRED EMBODIMENT

Figure 1:
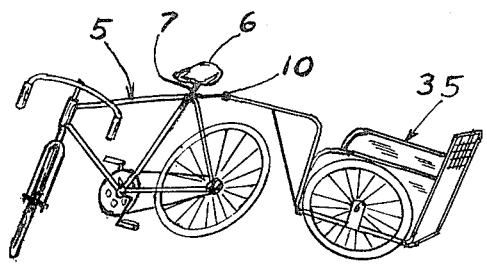
FIG. 1 is a side elevational view of a bicycle pivotally attached by our novel connector device to a two wheeled towed cart.

Referring to the drawings, in FIG. 1 we show a bicycle 5 having a seat 6 mounted on a vertical post. We provide an arm extending rearwardly horizontally from the seat post, indicated as 7. At the rearward end of 7 is conventionally mounted a towing pivot ball 8, having a reduced neck portion as shown. The towed plural wheeled vehicle, attached to the bicycle by our novel connector device, is illustrated generally as 35.

Our novel connector device is indicated generally as 10. That connector device comprises a relatively short solid shaft member 20, having a socket 21 formed at one end as shown, and also at the opposite end thereof is formed a central internally threaded longitudinal opening 24, for purpose to be explained. We provide a slidable sleeve 22 slidably over the shaft 20, of proportion as shown, and it has a peripheral longitudinal partial slot formed therein of restricted size, for reason to be explained. The socket in the shaft 20 is of the size for adapting the pivot ball 8, on the towing bicycle arm 7, secured to the bicycle post, to be vertically inserted therein, when the socket of the shaft is downwardly exposed. The sleeve 22 is slidably on 20 and is pushed forwardly, or to the left as illustrated, so that the notch 23 of the sleeve 22 will then mesh snugly over the reduced neck portion of the pivot ball 8, for reason to be explained. When the sleeve 22 is inserted to the left as illustrated, with the notch 23 meshed over the neck of the ball 8, then a conventional lock-snap ring 26 is tension snapped into a groove 25, provided peripherally at that point on the outer surface of the shaft 20, so that lock-snap ring 26 is held in that groove by virtue of its tension and in turn 26 holds the sleeve 22 in such neck holding position by the notch 23 when the pivot ball 8 is up in the socket 21, for holding 8 pivotally in 21, as shown in FIG. 4.

As viewed in FIG. 5, we provide an elongated stout externally threaded screw stud bolt 28, completely seated within the internal threaded central end opening 24 of that shaft 20. On that stud bolt 28, before it is so seated into the opening 24 of the shaft 20, we provide a slidable collar 30 as shown over that bolt, and before the bolt is so seated within the opening 24. Also on said stud bolt 28 and before the collar 30 is slidably placed thereover, we provide an expandable outer tensioned spiral spring 32, which normally is slightly compressed in its tension between the head 28a of the bolt 28 and said collar 30 slidably on that bolt. Thus, when 28 is screw seated within opening 24 the spring 32 normally holds the collar 30 slidably on 28 against the end of shaft 20, as shown, in FIG. 4. Slidable collar 30 on the bolt 28 has an external radial opening 30a, which is internally threaded for receiving a stud bolt 41 therein, as will be explained.

Referring to the towed vehicle 35, its tow bar 40 is a hollow tube-like tongue bar, and at its forward end has an opening in which a small threaded stud bolt 41 is adapted to be inserted. That bolt 41 is then secured through that opening into the radially threaded opening 30a of the slidable collar 30 on the shaft 20, just explained. The towing bicycle, by means of our novel connector pulling device 10, accomplishes a pulling through our novel connector device 10 and against the tension of the tension spring 32 on bolt 28, as a result of the tow bar 10 of the towed vehicle being secured to the slidable collar 30. Said bolt 28 is secured in place to the longitudinal shaft 20. The pulling torque of the bicycle is by ball 8 held in socket 21 and shaft 20 and to which shaft the bolt 28 is secured, with the vehicle tongue 40 bolted onto slidable collar 30 on bolt 28. Thus the towed vehicle is spring tension pulled against the tension of spring 32 on bolt 28 as the bicycle pulls forwardly, or to the left as illustrated. Our novel connector device 10 permits a rotating and longitudinal sliding of the collar 30 against spring 32 tension on the bolt 28; thus, any rotation of the members 20 and its bolt 28, extending through 30, will not effect any rotational movement of slidable collar 30 slidably on bolt 28, and to which collar 30 the tongue 40 of the cart 10 is secured. Also, any rotation of the shaft 20 as may be caused by the bicycle through pivot ball 8, will not cause the collar 30 to rotate, because 30 is not connected to 20, but 30 is slidably and rotatably on the bolt 28. There is no turning rotational torque of the towing bicycle exerted on the towed vehicle shaft 40, because of 40 being secured to 30. In the event the towing bicycle were to be in an accident or fall over horizontally, or be laid on the ground, there is no rotational torque exerted through our novel connector device 10 to the tow bar 40, which is rotatable through 30, as explained, on 28. Bolt 28 secured to shaft 20, as explained, holds collar 30 rotatably thereon by tension spring 32 and bolt head 28a.

To restate: The forward bicycle pulling is exerted through our connector device 10 to the towed cart 35, with the forward bicycle pulling being by pivot ball 8 held in socket 21 of shaft 20 by the sleeve 22 and that sleeve 22 held by the snap-ring 26. Cart 35 tongue 40 is secured to the rotatable-slidable collar 30. Collar 30 is held against 20 on the bolt 28 by the normal expansion spring 32, and bolt head 28a. The slidable and rotatable collar 30 on bolt 28 is not secured to shaft 20, but merely slidably end-wise smoothly abuts the end of 20. Thus any accidental rotation of 20 and its bolt 28 does not cause a rotation of collar 30, as the ends of 20 and 30 slidably abut and are rotatable one with relation to the other. Bolt 28 is secured to the shaft 20, and thus when the shaft is pulled as just explained by the pivot ball socket, that shaft pulls that bolt 28. That forward pulling of 28 by 20 is then accomplished by the head 28a of the bolt 28. Said forward pulling by the bolt head 28a is exerted through compression spring 32, forwardly or to the left as illustrated, and exerts that pulling pressure by 32 against the end of rotatable slidable collar 30 on 28. Spring 32 on 28 is not connected to the collar 30, but slidably abuts the end of 30 as shown. The spring 32 is normally of a greater length than the distance between bolt head 28a and the collar 30 before assembly on the bolt as explained. This novel construction comprises rotatable slidable spring tensioned pulling means on and cooperating with the pulling bolt having a radial head abutment thereon for transmitting the pulling torque.

Figure 2:
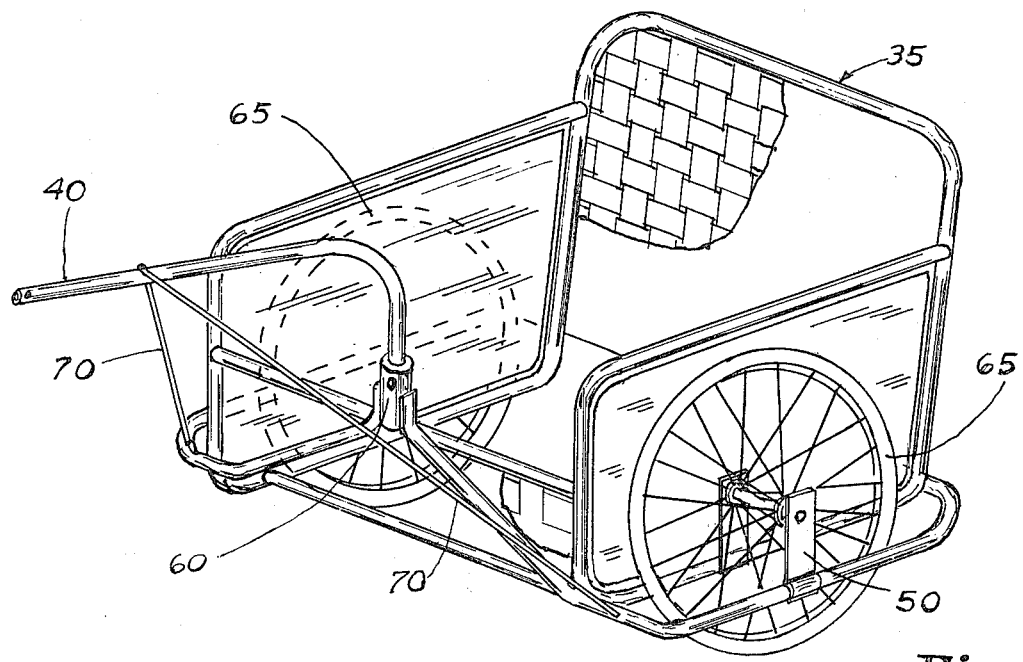
FIG. 2 is another elevational view of that towed vehicle alone.
Figure 3:
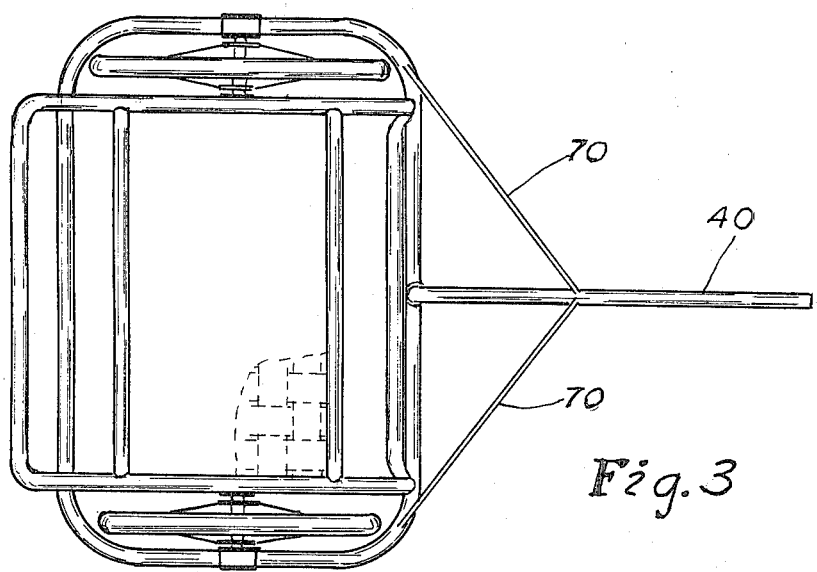
FIG. 3 is a plan view of the towed vehicle of FIG. 2.

We provide our towed cart with an underslung tubular aluminum frame of construction shown, in FIG. 2. That cart frame is hung by straps 50 onto the axles of its wheels 65. To the front cross bar of that cart frame we secure the demountable upside down reverse L-shaped tow bar 40, as shown to preserve that underslung center of gravity of the cart on its wheels, as pulled by 40 by the towing bicycle.

By means of straps 50 the center of gravity of the frame of vehicle 35 is hung below and onto the axles of said wheels, as shown. With that low center of gravity, there is more of a safety factor provided by our so making and mounting the frame of the towed vehicle 35 on its wheels, in the event of any towing bicycle accident, to prevent any resultant accidental upsetting of vehicle 35.

We provide conventional telescopic joint means, illustrated as 60, for securing the two-piece sectional tow bar tongue 40 together to form a rigid tow bar as shown, after the vehicle has reached the point of destination. Such telescopic connection is held by conventional stud bolt securement, not illustrated. A suitable wishbone shaped reinforcing arm, indicated as 70, is provided to support the tow bar 40 after it is assembled. Those arms are suitably conventionally detachable, with each by a conventional screw threaded end through a hole formed in the vehicle cross frame, with a removable screw nut holding in place. During shipping, such parts will not need to be in place, and can be placed as shown upon reaching the point of destination.

While our described combination, of the towing bicycle and the towed plural wheel vehicle and our connector device, is mentioned as a preferred embodiment, it is to be understood that our novel connector device may be used as a connector for any trailer to be pulled by any two wheeled towing vehicle.

Though we have illustrated and described only our preferred embodiment of our invention, it is to be understood that many and numerous changes may be made within the spirit, scope and teaching thereof without departing therefrom, and, therefore, we wish to be bound only by the hereunto appended claims:

What we claim and desire to secure by Letters Patent is:

1. In combination, with a towing bicycle having a frame, a seat thereon, and a pivot ball with a reduced neck secured rearwardly from the frame or the seat post thereof, and a towed plural wheeled vehicle cart having a tow bar tongue, the combination therewith of a connector device, for attachment connection to and between said bicycle pivot ball and said tow bar of the towed cart, comprising, a shaft having a socket formed on the periphery and inwardly radially thereof adapted to receive said bicycle pivot ball therein for permitting said socket and ball to pivot with relation to each other, a sleeve member slidably on said shaft and having a notch formed at one of its peripheral ends and adapted to fit over the neck of the pivot ball for holding the ball pivotally in the shaft socket when the ball is inserted in the socket and when said sleeve is then slidably so positioned on the shaft with its notch over the ball neck, a peripheral groove formed externally on the shaft remote from the socket, a cotter spring tension ring member means removably positioned in the said shaft groove for a holding of the sleeve slidably over the shaft in pivot ball neck holding position, the shaft having an internally screw threaded opening formed at one of its ends longitudinally centrally thereof, an elongated stud headed screw bolt adapted to be screw inserted and held within the shaft threaded opening in longitudinal extension thereof, a slidable collar on said stud screw bolt, a spiral normally expandable tension spring on the stud screw bolt and positioned thereon and extending between said slidable collar on the bolt and the bolt head for normally spring tension resisting any sliding movement of the collar on that bolt toward said bolt head, said slidable collar on said bolt being slidably abutting the end of the shaft to which the bolt is secured and having a radial peripheral internal screw threaded opening formed therein, and bolt screw securement means on the tongue adapted for cooperating with said radial threaded opening of the collar for thereby removably securing the tongue to the slidable collar on the bolt.

* * * * *